United States Patent

[11] 3,582,639

| [72] | Inventor | John R. Chamberlain<br>P.O. Box 569, Gulf Breeze, Fla. 32561 |
|---|---|---|
| [21] | Appl. No. | 754,772 |
| [22] | Filed | Aug. 23, 1968 |
| [45] | Patented | June 1, 1971 |

[54] EMERGENCY SIGNAL LIGHT FOR AUTOMOBILE
3 Claims, 5 Drawing Figs.

| [52] | U.S. Cl. | 240/7.1 |
|---|---|---|
| [51] | Int. Cl. | B60q 1/52 |
| [50] | Field of Search | 240/2, 7.1, 8.18, 8.3 |

[56] References Cited
UNITED STATES PATENTS

| 2,510,818 | 6/1950 | Grimes | 240/7.1(UX) |
|---|---|---|---|
| 2,736,005 | 2/1956 | Craddock | 240/7.1(X) |
| 2,772,406 | 11/1956 | Juergens | 240/7.1(X) |
| 2,891,235 | 6/1959 | Halpert | 240/7.1(X) |
| 3,109,597 | 11/1963 | Baldwin | 240/7.1 |
| 3,175,186 | 3/1965 | Barenyi | 240/8.18(X) |

*Primary Examiner*—Samuel S. Matthews
*Assistant Examiner*—Russell E. Adams, Jr.
*Attorney*—Harry B. Rook ABSTRACT: A casing containing a signal lamp is secured in a mounting plate which is hinged at one edge to a support bar mounted on a structure such as the inner wall of an automobile trunk lid. Means including parts on another edge of said plate and on said structure, respectively, selectively releasably holds the plate in an out-of-the-way position against the structure and permits the plate to swing by gravity about its hinged edge away from said structure into operative position to project light rays.

PATENTED JUN 1 1971 3,582,639
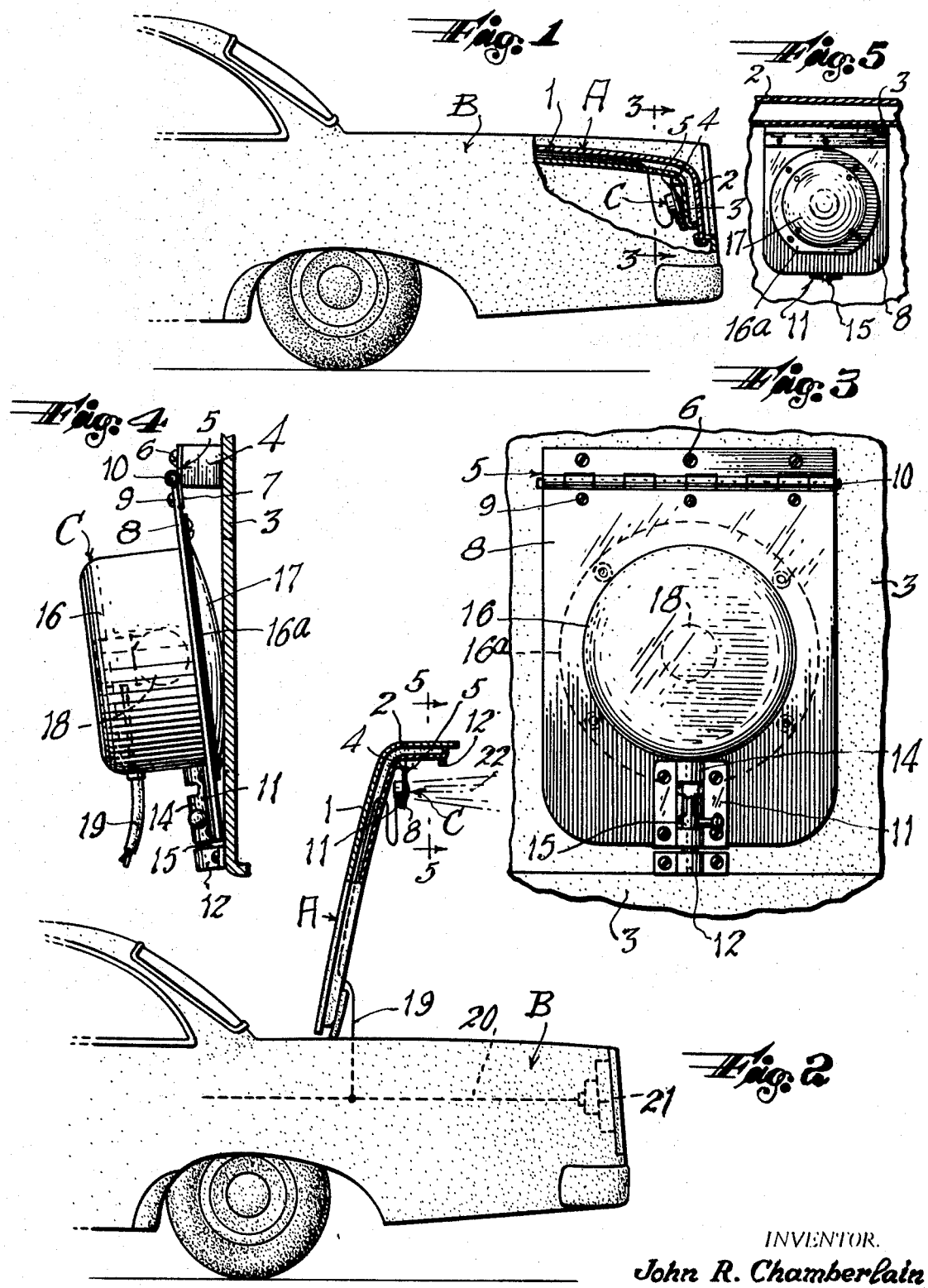
INVENTOR.
John R. Chamberlain
BY
ATTORNEY 3,582,639

EMERGENCY SIGNAL LIGHT FOR AUTOMOBILE

BACKGROUND OF THE INVENTION

1. Field of the Invention

This invention relates in general to signal lights and particularly to a signal light mounted on the inside of the lid of an automobile trunk to warn approaching motorists in case the automobile carrying the light breaks down on the road.

2. The Prior Art

Signal devices of this type are well known, as shown for example by U.S. Pat. Nos. 2,736,005; 2,891,235 and 2,772,406; and they include a lamp casing, which when the trunk lid is closed, is disposed in an out-of-the-way position close to the inner surface of the lid, and which when the lid is open can be swung into a position to project light rays rearwardly from the automobile.

These known signal lights are too complicated and expensive in construction including an excessive number of costly parts which too easily get out of order and which to install and use properly require more know-how and skill than is possessed by many automobile drivers.

SUMMARY

One object of the invention is to provide a signal device which includes novel and improved construction and combination of a lamp casing and means for mounting it which is simple and inexpensive in construction and which is easy to install and operate with a minimum need for skill.

The invention also contemplates a simple mounting plate having a lamp casing secured therein with the addition of simple means for hingedly mounting the plate at one edge on a trunk lid, and simple, reliable means at another edge of the plate for releasably locking or holding the plate in normal inoperative or out-of-the-way position.

BRIEF DESCRIPTION OF THE DRAWING

FIG. 1 is a side elevation of the trunk portion of an automobile with the trunk lid closed and with portions broken away and shown in section, and illustrating the signal light in out-of-the-way or inoperative position.

FIG. 2 is a side elevation of the trunk portion of the automobile with the trunk lid open and with the signal light in operative position.

FIG. 3 is an enlarged fragmentary sectional view approximately on the plane of the line 3-3 of FIG. 1, showing the signal device in rear elevation.

FIG. 4 is a side elevation of the signal device and a sectional view of the portion of the trunk lid on which the device is mounted, and FIG. 5 is an enlarged front elevation of the signal device taken approximately from the plane of the line 5-5 of FIG. 2.

DESCRIPTION OF THE PREFERRED EMBODIMENT

For the purpose of illustrating the principles of the invention, the signal device has been shown as mounted on the lid A of the trunk portion B of an automobile. The lid has a main or top wall 1 and a rear end wall 2, both formed of two spaced-apart layers of metal.

The signal device C embodying the invention is shown as mounted on the inside of the inner layer 3 of the trunk lid and is normally disposed in an out-of-the-way position in close relation to the end wall 3, as shown in FIG. 1, but is mounted so that it may be swung outwardly from said end wall into operative position as shown in FIG. 2 when the trunk lid is open.

The means for mounting the signal light on the trunk lid is shown as comprising a support bar 4 which is rigidly secured to the inner layer of the trunk lid. A hinge, preferably a piano hinge 5, has one section secured to said support bar as by screws 6 and has its other section 7 secured to one edge portion of a mounting plate 8, as by screws 9. The two sections are connected by a hinge pintle 10 in the usual manner. The axis of the hinge pintle is horizontal so that the plate 8 is at its upper edge, suspended on or hangs from the pintle in an approximately vertical plane to permit the plate to be swung against and away from the end wall of the trunk lid as shown in FIGS. 1 and 2, respectively. One lower edge of the mounting plate, preferably the edge opposite the hinged edge has connected thereto one section or part 11 of a locking, holding or latching device which coacts with another section or part 12 secured to the wall 3 of the trunk lid before the first-mentioned section. For the purpose of illustration, a known type of slide bolt has been shown, comprising a guide plate 14 for a slide bolt 15 which is vertically slidable and cooperates with the keeper section 12 in the usual manner so that when the bolt is slid to one position as shown in FIGS. 3 and 4 the bolt coacts with the keeper to hold the mounting plate 8 in its out-of-the-way position, while when the bolt is slid in the opposite direction it is disengaged from the keeper so as to permit the mounting plate to swing about its hinge away from the end wall of the trunk lid as shown in FIGS. 2 and 5.

The mounting plate has a hole therethrough in which is fitted the casing 16 of an electric lamp 18 indicated by dotted lines, the casing projecting from one side of the plate and having a bezel or flange 16a secured to the other side of the plate and holding a lens 17 at the other side of the plate through which the light from the lamp is projected. The casing and lens are so related to the plate and the end wall of the trunk that the lens is protected against damage by both the mounting plate and the wall of the lid when the plate is in its out-of-the-way position.

The lamp is connected in any suitable circuit, but preferably by wires 19 and 20 in the circuit with the usual emergency lights 21 that are mounted at the rear of the vehicle.

The manner of use of the signal device is almost self-evident. Normally the mounting plate 8 is swung against the inner wall of the trunk lid and releasably locked thereto by, in the present instance, the slide bolt 15 and the keeper 12, when the trunk lid is closed.

In case of emergency, for example upon a breakdown of the automobile, the trunk lid is opened and the lock is manipulated to release the mounting plate which then swings by gravity into operative position as shown in FIG. 2 so as to project light rays indicated at 22 rearwardly from the vehicle. If desired a switch could be connected in circuit with the lamp 18 to control the energization and deenergization thereof independently of the regular lights, and when preferred the switch could be of the flasher type.

The mounting plate 8 having the lamp casing secured in a hole therein and being hingedly mounted at one edge on the bar 4 and releasably held in out-of-the-way position by a locking means at another edge of the plate, a new combination of parts, constitutes an extremely simple, inexpensive, easily installable and easily operable emergency signal.

I claim:

1. An emergency lamp comprising a single plate having a hole therethrough, a casing containing a lamp and extending through said hole and projecting from one side of said plate, said casing having a flange secured to said plate and a lens at the other side of said plate, a support bar adapted to be mounted on an automobile trunk lid, a hinge connecting said plate at one edge thereof to said support bar with the axis of the hinge parallel to said edge of the plate, and locking means including a part mounted on the first-mentioned side of the plate and a coacting part adapted to be mounted on said trunk lid for normally holding said plate in an out-of-the-way close relation juxtaposed to said trunk lid with the lens disposed between said plate and the trunk lid and protected against damage.

2. An emergency lamp as defined in claim 1 whose support bar is mounted on an automobile trunk lid which includes a horizontal top wall hinged on the trunk and a vertical end wall, said support bar being secured on said end wall with the axis of said hinge horizontal and with said plate depending from the hinge in approximately a vertical plane with the hinge at its upper edge, the first-mentioned part of the locking means being located at the lower edge of the plate and the second-mentioned part of said locking means being mounted on the said end wall of the trunk lid and beneath the first-mentioned part when the plate is in an out-of-the-way position.

3. An emergency lamp as defined in claim 2 wherein the first-mentioned part of said locking means comprises a slide bolt and a guide therefor mounted on said plate at the edge thereof opposite said hinge so that the bolt is slidable vertically, and the second-mentioned part of the locking means is a keeper for said bolt mounted on said vertical end wall.